United States Patent
Daiku et al.

(10) Patent No.: US 7,106,368 B2
(45) Date of Patent: Sep. 12, 2006

(54) METHOD OF REDUCING FLICKER NOISES OF X-Y ADDRESS TYPE SOLID-STATE IMAGE PICKUP DEVICE

(75) Inventors: Hiroshi Daiku, Kawasaki (JP); Iwao Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 809 days.

(21) Appl. No.: 10/012,391

(22) Filed: Dec. 12, 2001

(65) Prior Publication Data

US 2002/0158971 A1 Oct. 31, 2002

(30) Foreign Application Priority Data

Apr. 26, 2001 (JP) ............... 2001-130150

(51) Int. Cl.
*H04N 9/73* (2006.01)
(52) U.S. Cl. .................................. 348/226.1
(58) Field of Classification Search ............. 348/226.1, 348/227.1
See application file for complete search history.

(56) References Cited

U.S. PATENT DOCUMENTS

| | | | | |
|---|---|---|---|---|
| 5,239,369 | A * | 8/1993 | Suzuki | 348/226.1 |
| 6,147,706 | A * | 11/2000 | Inuiya et al. | 348/226.1 |
| 6,657,659 | B1 * | 12/2003 | Van Rooy et al. | 348/226.1 |
| 6,710,818 | B1 * | 3/2004 | Kasahara et al. | 348/607 |
| 6,882,363 | B1 * | 4/2005 | Oda et al. | 348/226.1 |
| 2001/0033334 | A1 * | 10/2001 | Bakker et al. | 348/226 |

FOREIGN PATENT DOCUMENTS

| | | |
|---|---|---|
| EP | 1 091 571 A2 | 4/2001 |
| EP | 1 091 571 A3 | 4/2001 |
| JP | 63-308484 | 12/1988 |
| JP | 11-088780 | 3/1999 |
| JP | 2000-106673 | 4/2000 |
| WO | 00/07363 | 2/2000 |

OTHER PUBLICATIONS

Hurwitz, Jeg, et al., "A Miniature Imaging Module For Mobile Applications", 2001 IEEE International Solid-State Circuits Conference, Digest of Technical Papers, Feb. 5-7, 2001.

* cited by examiner

*Primary Examiner*—David Ometz
*Assistant Examiner*—James M. Hannett
(74) *Attorney, Agent, or Firm*—Staas & Halsey LLP

(57) ABSTRACT

It is an object of the invention to provide a method of reducing flicker noises in an X-Y address type solid-state image pickup device for reducing flicker noises generated by a fluorescent light for room illumination when taking a picture in door.

A configuration is provided in which signal storage time ts resulting in no flicker noise under a fluorescent lamp having an emission frequency of 120 Hz is preset (step S1); average luminance of image data is calculated for each frame in a predetermined average luminance detection area allocated in the frame (step S2); a difference in average luminance is calculated between frames (step S3); and the signal storage time ts is changed based on the difference in luminance (steps S4, S5 and S6).

11 Claims, 6 Drawing Sheets

FIG.5

|    | cos   | sin   |
|----|-------|-------|
| 0  | −0.25 | 0     |
| 1  | −0.25 | −0.25 |
| 2  | 0.25  | −0.5  |
| 3  | 0.75  | 0     |
| 4  | 0.5   | 1     |
| 5  | −0.5  | 1     |
| 6  | −1    | 0     |
| 7  | −0.5  | −1    |
| 8  | 0.5   | −1    |
| 9  | 1     | 0     |
| 10 | 0.5   | 1     |
| 11 | −0.5  | 1     |
| 12 | −1    | 0     |
| 13 | −0.5  | −1    |
| 14 | 0.5   | −1    |
| 15 | 1     | 0     |
| 16 | 0.5   | 1     |
| 17 | −0.5  | 1     |
| 18 | 0.5   | 0     |
| 19 | 1     | −1    |
| 20 | 0.5   | −1    |
| 21 | −0.5  | 0     |
| 22 | −1    | 1     |
| 23 | −0.5  | 1     |
| 24 | 0.5   | 0     |
| 25 | 1     | −1    |
| 26 | 0.5   | −1    |
| 27 | 0.75  | 0     |
| 28 | 0.25  | 0.5   |
| 29 | −0.25 | 0.25  |
| 30 | −0.25 | 0     |

METHOD OF REDUCING FLICKER NOISES OF X-Y ADDRESS TYPE SOLID-STATE IMAGE PICKUP DEVICE

BACKGROUND OF THE INVENTION

1. Field of the Invention

The present invention relates to a method of reducing flicker noises which are generated on a screen of an X-Y address type solid-state image pickup device by a fluorescent lamp for room illumination when photographing a room with the pickup device.

2. Description of the Related Art

Solid-state image pickup devices are recently used in an enormous quantity by incorporating them in various products such as digital still cameras, digital video cameras, and portable telephones. Solid-state image pickup devices are generally classified into CCD (charge coupled device) solid-state image pickup devices comprising a charge transfer type image sensor and X-Y address type solid-state image pickup devices in which an image sensor is constituted by a CMOS transistor (Complementary Metal Oxide Semiconductor). X-Y address type image pickup devices utilizing a CMOS image sensor are expected to replace CCD solid-state image pickup devices for the reason that they can be manufactured using a technique similar to a MOSFET manufacturing process; they can be driven by a single power supply with small power consumption; and various signal processing circuits can be loaded on the same chip.

A CMOS image sensor has a plurality of pixel regions which are connected to a plurality of vertical selection lines and horizontal selection lines and which are arranged in the form of a matrix. A photoelectric conversion device such as a photodiode is formed in each of the pixel regions. Light which has entered a light-receiving surface of each of the photoelectric conversion devices is subjected to photoelectric conversion, and an electric charge is accumulated in the device. The accumulated electric charge is converted by a source follower amplifier or the like provided in the pixel into a voltage which is then amplified and read out as image data for one pixel at predetermined timing.

Image data of a plurality of pixels connected to a predetermined horizontal selection line are output at a time in response to a line selection signal from a vertical scan shift register and are sequentially output to an external system based on a column selection signal from a horizontal scan shift register.

In an in-door photographic environment, a fluorescent lamp is often used as illumination. In Japan, the emission frequency of fluorescent lamps depends on districts. The emission frequency is 100 Hz (power supply frequency is 50 Hz) in some districts and 120 Hz (power supply frequency is 60 Hz) in some districts. FIGS. 6(a), 6(b), 7(a) and 7(b) show relationships between the emission frequencies of fluorescent lamps and a signal storage time of a conventional CMOS image sensor. Those figures indicate time along the abscissa axes and indicate quantities of light emitted by the fluorescent lamp along the ordinate axes. FIGS. 6(a) and 7(a) show a case wherein a fluorescent lamp having an emission frequency of 100 Hz (emission period (blinking period): 1/100 sec.) is used, and FIGS. 6(b) and 7(b) show a case wherein a fluorescent lamp having an emission frequency of 120 Hz (emission period (blinking period): 1/120 sec.) is used.

Referring to FIGS. 6(a) and 6(b), a description will now be made on signal storage performed by a photodiode at a pixel connected to a horizontal selection line in an x-th place from the beginning of a frame (hereinafter referred to as "x-th line"). A time at which signal storage is started on the x-th line is represented by 1xb; a time at which signal storage is terminated is represented by 1xe; and the signal storage time (integration time) is represented by ts.

For example, one frame period T is 1/30 (sec.) where frame period T is the sum of a vertical scanning period and a vertical blanking period required for the first horizontal selection line through the last horizontal selection line. Therefore, a frame frequency f is 30 Hz.

Since the signal storage time ts of a photodiode is a period required for reading image data after a reset pulse for resetting the photodiode is input, the signal storage time ts can be changed by changing the timing of the input of the reset pulse.

First, in the case of a fluorescent lamp having an emission period of 1/120 sec. as shown in FIG. 6(b), an integral multiple (four times) of the emission period of the fluorescent lamp corresponds to one frame period of a CMOS image sensor. Therefore, the signal storage starting time 1xb and signal storage ending time 1xe on the x-th line are the same timing relative to the emission periods of the fluorescent lamp in an n-th frame and an (n+1)-th frame. Thus, when an image is picked up under the fluorescent lamp having an emission frequency of 120 Hz, the brightness (the area of the hatched regions in the figure) of the image is constant between the frames.

In the case of a fluorescent lamp having an emission period of 1/100 sec. as shown in FIG. 6(a), an integral multiple of the emission period of the fluorescent lamp does not agree with one frame period of a CMOS image sensor, and there are 100/30≅3.3 periods per frame. Therefore, the signal storage starting time 1xb and signal storage ending time 1xe on the x-th line will not be the same timing relative to the emission periods of the fluorescent lamp in the n-th frame and (n+1)-th frame unless the signal storage time ts is adjusted to the emission period of the fluorescent lamp. Thus, when an image is picked up under the fluorescent lamp having an emission frequency of 100 Hz, the brightness of the image will be different between the frames.

A description will now be made on signal storage at pixels connected to different horizontal lines (an x-th line and a y-th line) in the same frame as shown in FIGS. 7(a) and 7(b). A time at which signal storage is started on the y-th line is represented by 1yb, and a time at which signal storage is terminated is represented by 1ye. A signal storage time ts is the same as that of the x-th line.

As apparent from the figures, the signal storage starting time 1xb and signal storage ending time 1xe for the x-th line and the signal storage starting time 1yb and signal storage ending time 1ye for the y-th line will not be the same timing relative to the emission periods of both of the fluorescent lamps having emission frequencies of 100 Hz and 120 Hz. Therefore, those lines appear with different brightness in the same frame under both of the fluorescent lamps having emission frequencies of 100 Hz and 120 Hz.

FIGS. 8(a) through 8(d) show a specific example of the phenomenon described above with reference to FIGS. 6 and 7. FIG. 8(a) illustrates an image in the n-th frame picked up under the fluorescent lamp having an emission frequency of 100 Hz, and FIG. 8(b) illustrates an image in the (n+1)-th frame. As shown in FIGS. 8(a) and 8(b), on the images picked up under the fluorescent lamp having an emission frequency of 100 Hz, a phenomenon is observed in which bright and dark horizontal fringes having a period of 3.3 appear in the screen and the fringes gradually move upward or downward. This phenomenon is flicker noises that appear in an image picked up under a fluorescent lamp having an emission frequency of 100 Hz.

FIG. 8(c) illustrates an image in the n-th frame picked up under the fluorescent lamp having an emission frequency of 120 Hz, and FIG. 8(d) illustrates an image in the (n+1)-th frame. As shown in FIGS. 8(c) and 8(d), bright and dark horizontal fringes in four periods which are stationary in the screen are observed in the images picked up under the fluorescent lamp having an emission frequency of 120 Hz. This phenomenon is flicker noises that appear on an image picked up under a fluorescent lamp having an emission frequency of 120 Hz.

Flicker noises occurs not only in a CMOS image sensor but also in a CCD image sensor. Since a CCD image sensor employs a unique method for reading image data, irregularity of luminance as shown in FIGS. 8(a) through 8(d) does not appear on the same screen. Therefore no flicker noise occurs under the fluorescent lamp having an emission frequency of 120 Hz. Further, only flicker noises that result in a difference in brightness between frames occur under the fluorescent lamp having an emission frequency of 100 Hz. A method for reducing such flicker noises will now be briefly described with reference to FIGS. 9(a) and 9(b). FIGS. 9(a) and 9(b) show relationships between emission frequencies of fluorescent lamps and a signal storage time ts of a conventional CCD image sensor. Those figures indicate time along the abscissa axes and indicate quantities of light emitted by the fluorescent lamps along the ordinate axes. FIG. 9(a) shows a case wherein a fluorescent lamp having an emission frequency of 100 Hz is used, and FIG. 9(b) shows a case wherein a fluorescent lamp having an emission frequency of 120 Hz is used.

According to a method of reducing flicker noises of a CCD image sensor, as shown in FIG. 9(a), the signal storage time ts (a signal storage stating time sb and a signal storage ending time se) in one frame is fixed to a value which will not result in flickers under the fluorescent lamp having an emission frequency of 100 Hz, e.g., three times the emission period $1/100$ of the fluorescent lamp. When the signal storage time is preset at $3/100$ sec., a fluorescent lamp can be used without flickers whether it has an emission frequency of 100 Hz or 120 Hz.

In the case of a CMOS image sensor, however, flickers occur at either of the emission frequencies 100 Hz and 120 Hz as described above, and a signal storage time ts resulting in no flicker at both of the emission frequencies 100 Hz and 120 Hz does not exist in a frame period of $1/30$ sec. Therefore, the above-described method of reducing flickers in a CCD image sensor can not be used as it is in a CMOS image sensor.

SUMMARY OF THE INVENTION

It is an object of the invention to provide a method of reducing flicker noises in an X-Y address type solid-state image pickup device, the method reducing flicker noises generated by a fluorescent lamp for room illumination when a picture is taken in door.

The above-described object is achieved by a method of reducing flicker noises in an X-Y address type solid-state image pickup device for reducing flicker noises attributable to the emission frequency of illumination light generated in an X-Y address type image pickup device having a plurality of pixels for performing photoelectric conversion of incident light in a predetermined signal storage time and outputting image data, the method comprising the steps of calculating average luminance of the image data for each frame in a predetermined average luminance detection area allocated in the frame, calculating a difference in the average luminance between frames, and changing the signal storage time based on the difference in luminance.

The above-described object is achieved by a method of reducing flicker noises in an X-Y address type solid-state image pickup device for reducing flicker noises attributable to the emission frequency of illumination light generated in an X-Y address type image pickup device having a plurality of pixels for performing photoelectric conversion of incident light in a predetermined signal storage time and outputting image data, the method comprising the steps of providing two average luminance detection areas in each frame, calculating average luminance of the image data in the two average luminance detecting areas of a plurality of frames, performing a sum-of-product calculating process on the plurality of values of average luminance to calculate a sum of products, and changing the signal storage time based on the sum of products.

BRIEF DESCRIPTION OF THE DRAWINGS

FIG. 5 is a table showing sum-of-product coefficients used in the method of reducing flicker noises in a CMOS image sensor according to the second embodiment of the invention;

DETAILED DESCRIPTION OF THE PREFERRED EMBODIMENTS

Figure 1:
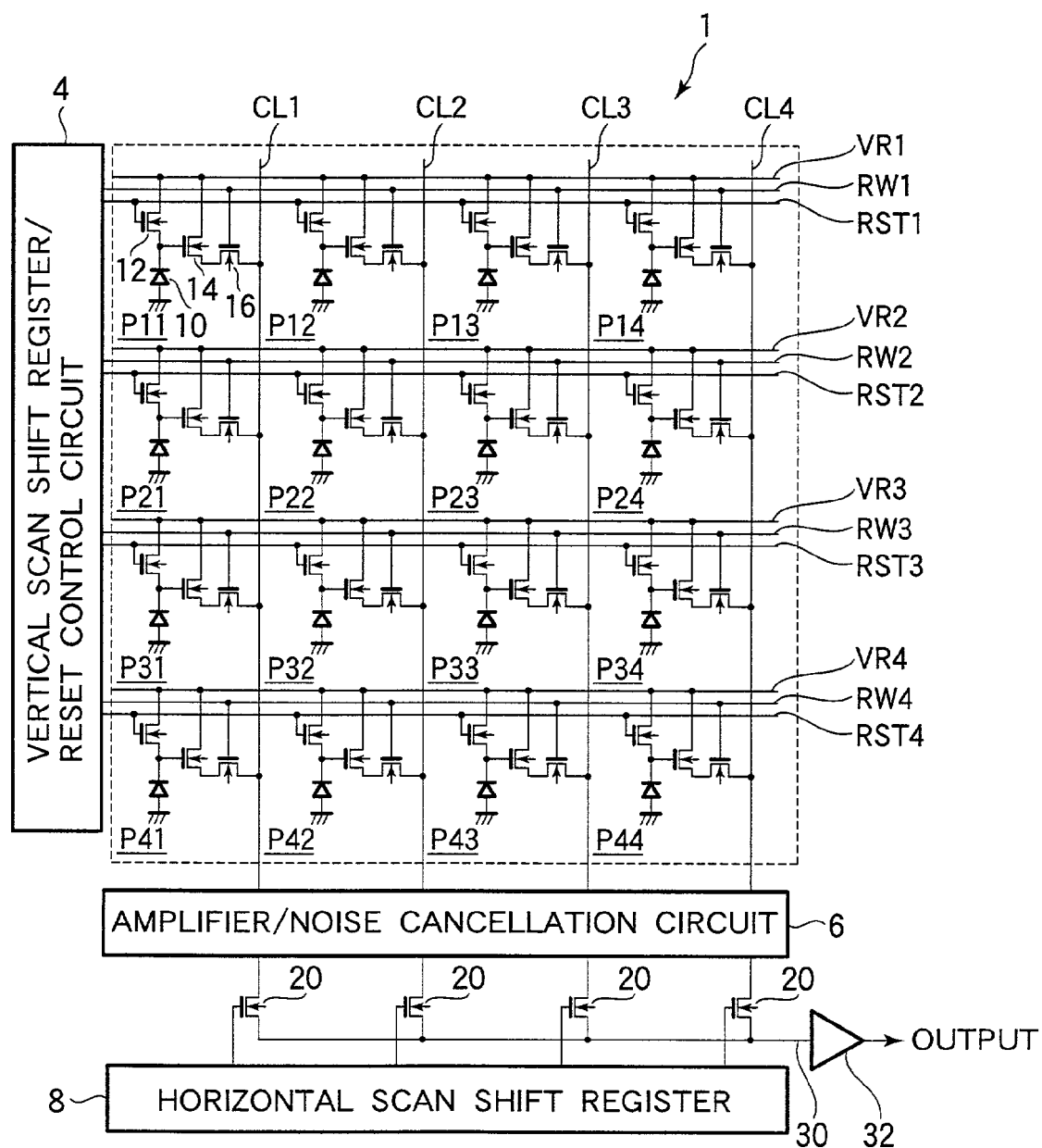
FIG. 1 is a diagram showing an example of a circuit for 4×4 pixels of a CMOS image sensor 1 according to a first embodiment of the invention.

A method of reducing flicker noises in an X-Y address type solid-state image pickup device according to a first embodiment of the invention will now be described with reference to FIGS. 1 through 3. First, a description will be made with reference to FIG. 1 on a schematic configuration of a CMOS image sensor which is an X-Y address type solid-state image pickup device according to the present embodiment. FIG. 1 shows an example of a circuit for 4×4 pixels of a CMOS image sensor 1 having a pixel array formed by m rows and n columns. Pixel regions P11 through P44 connected to a plurality of vertical selection lines CL1 through CL4 and horizontal selection lines RW1 and RW4 are arranged in the form of a matrix. A photodiode 10 as a photoelectric conversion device is formed at each of the pixel regions P11 through P44. For example, a photo-gate may be used instead of the photodiode 10 as a photoelectric conversion device.

The CMOS image sensor 1 has an APS (active pixel sensor) configuration in which a source follower amplifier 14 constituted by a MOSFET, for example (an n-channel MOSFET is shown as an example in the present embodiment), a horizontal selection transistor 16, and so on are provided in each of the pixel regions P11 through P44.

A circuit configuration of a pixel region Pmn will now be described where m represents the row number and n represents the column number. For example, the cathode of the photodiode in the pixel region Pmn is connected to a source electrode of a reset transistor 12 that is an n-channel MOSFET and to a gate electrode of a source follower amplifier 14.

A drain electrode of each of the reset transistor 12 is connected to a reset voltage supply line VRm to which a reset voltage VR is applied, and a gate electrode of the same is connected to a reset signal line RSTm. A drain electrode of the source follower amplifier 14 is connected to the reset voltage supply line VRm, and a source electrode of the same is connected to a drain electrode of a horizontal selection transistor 16 that is an n-channel MOSFET, for example. A gate electrode of each horizontal selection transistor 16 is connected to a horizontal selection line RWm to which a selection signal is supplied. A source electrode of each horizontal selection transistor 16 is connected to a vertical selection line CLn.

The reset voltage supply lines VRm and horizontal selection lines RWm are connected to a vertical scan shift register/reset control circuit 4. A selection signal is sequentially output by a shift register (not shown) provided in the vertical scan shift register/reset control circuit 4 to the horizontal selection lines RWm at predetermined timing.

Each of the vertical selection liens CLn is connected to a signal common output line 30 through an amplifier/noise cancellation circuit 6 and a column selection transistor 20 that is an n-channel MOSFET, for example. A column selection signal is sequentially input to gate electrodes of the column selection transistors 20 from a horizontal scan shift register 8. Image data from which noises having a fixed pattern have been eliminated are sequentially output to the signal common output line 30 from the amplifier/noise cancellation circuit 6 and are transmitted to an external system through an amplifier 32.

An operation of the CMOS image sensor 1 will now be briefly described. First, when a reset transistor 12 is turned on by a reset signal RST at predetermined timing, the photodiode 10 is charged to reach a reset potential VR. Then, discharge of the photodiode 10 begins as a result of incidence of light, and the potential of the same drops below the reset potential VR. When a horizontal selection signal RW is output to a horizontal selection line RWm after a predetermined time passes, the horizontal selection signal RW is input to the gate electrode of a horizontal selection transistor 16 connected to the horizontal selection line RWm to turn the horizontal selection transistor 16 on. As a result, an output voltage from the source follower amplifier 14 is output to the vertical selection line CLn as image data of the pixel region Pmn.

A method of reducing flicker noises in a CMOS image sensor having the above-described basic configuration will now be described with reference to FIGS. 2 and 3. FIG. 2 shows steps of a method of reducing flicker noises in a CMOS image sensor according to the present embodiment. FIG. 3 schematically shows a light-receiving surface of the CMOS image sensor.

Figure 2:
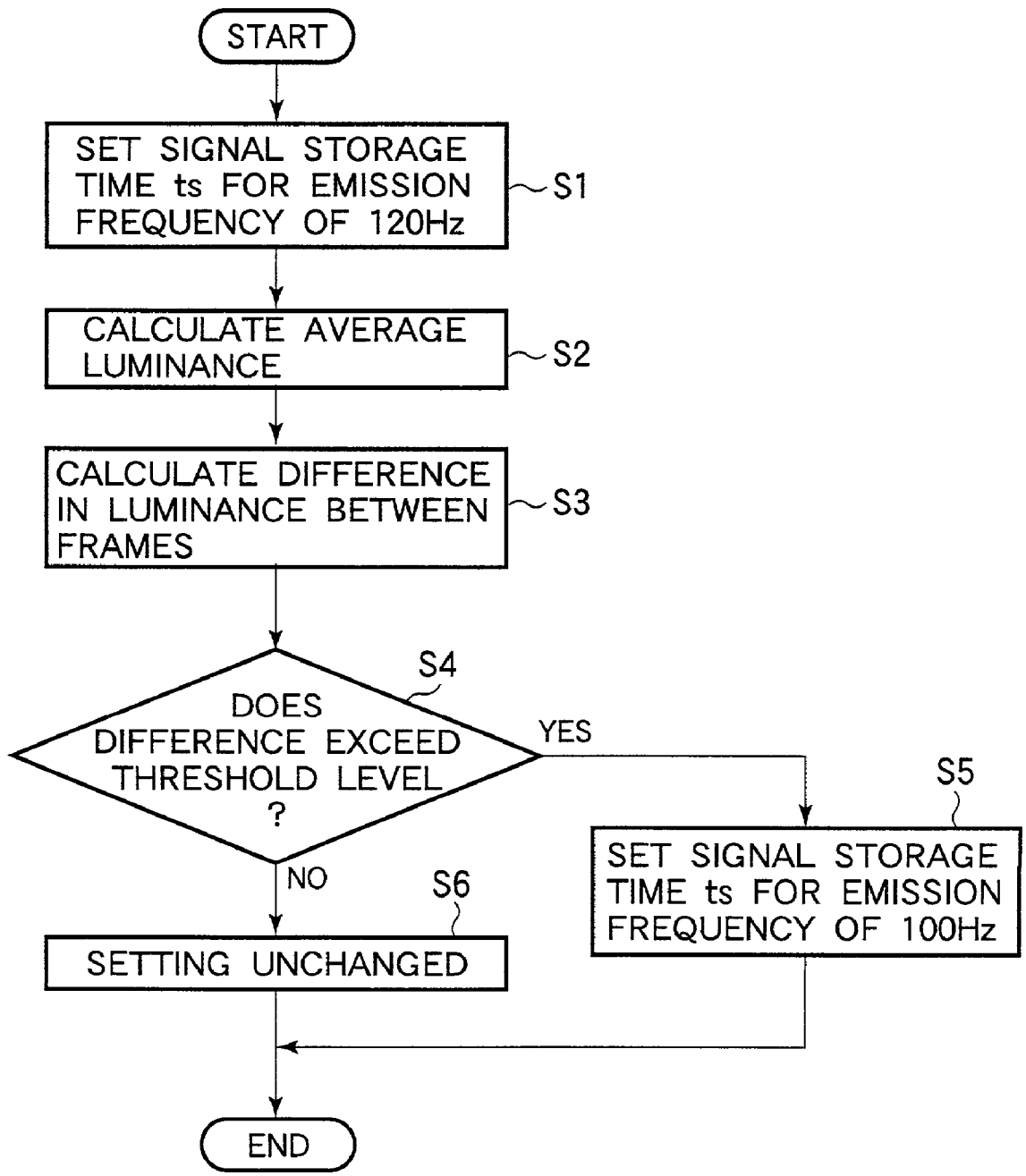
FIG. 2 shows steps of a method of reducing flicker noises in a CMOS image sensor according to the first embodiment of the invention.
Figure 3:
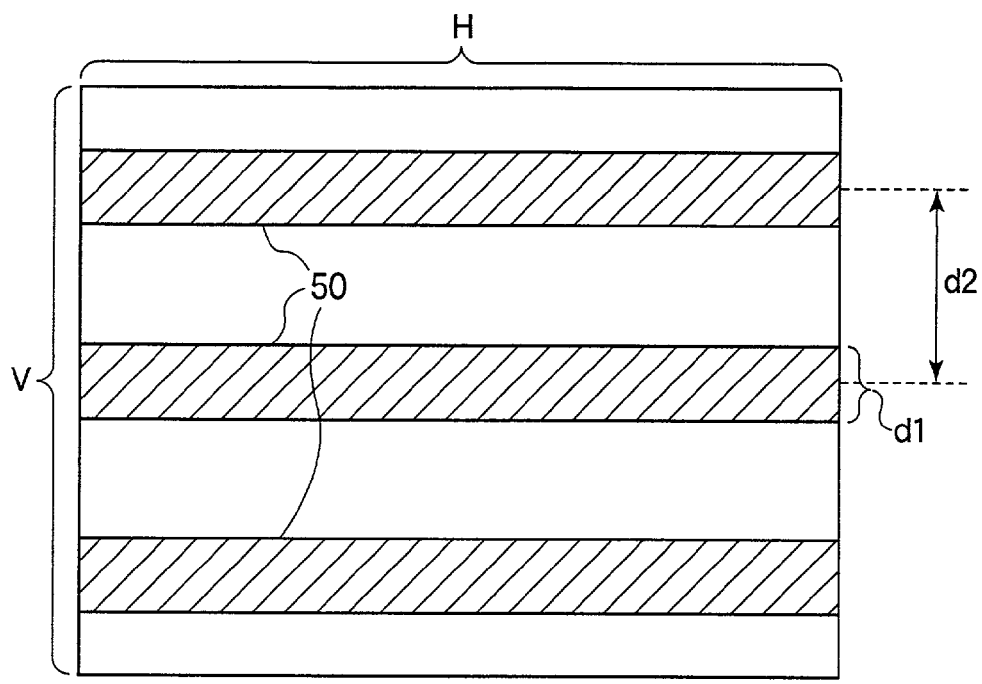
FIG. 3 illustrates the method of reducing flicker noises in a CMOS image sensor according to the first embodiment of the invention.

Referring to FIG. 2, an initial value of a signal storage time of the CMOS image sensor is first set at a signal storage time ts which does not result in flicker noises under a fluorescent lamp having an emission frequency of 120 Hz (step S1). When a fluorescent lamp has an emission period of $1/120$ sec., irregularities of luminance in one frame (changes in brightness and darkness as shown in FIGS. 8(a) through 8(d)) attributable to flicker noises have a period of $1/120$ sec. Therefore, a possible value of the signal storage time ts in order to prevent the occurrence of flicker noises under the fluorescent lamp having an emission frequency of 120 Hz is $1/120$, $2/120$, $3/120$ or $4/120$ sec. that is an integral multiple of the same period and that is equal to or shorter than $1/30$ sec. which is one frame period of the CMOS image sensor.

Next, average luminance (Yave) of the image data is calculated in a predetermined average luminance detection area of each frame (step S2). FIG. 3 indicates average luminance detection areas 50 with hatched lines provided in three locations that are substantially equally spaced by d2 horizontal selection lines. In FIG. 3, a plurality of pixels are connected to one horizontal selection line in the direction indicated by H (horizontal direction). Each of the average luminance detection areas 50 is formed by a plurality of pixels connected to a predetermined number d1 of horizontal selection lines adjacent to each other. The number d1 of horizontal selection lines in each average luminance detection area 50 is set such that it does not coincide with an integral multiple of the period of irregularities of luminance attributable to flicker noises.

For example, when a fluorescent lamp has an emission period of $1/100$ sec., irregularities of luminance in one frame attributable to flicker noises have a period of $1/100$ sec. In the case of a frame period of 30 Hz, one frame period is $1/30$ sec. Therefore, if the number d1 of horizontal lines in each average luminance detection area 50 is set at a value that is substantially $3/10$ times, $6/10$ times or $9/10$ times the total number V of horizontal selection lines, luminance is detected in a period that is an integral multiple of the period of irregularities of luminance. Since this results in the same average luminance in all frames, it will not be possible to determine the type of the fluorescent lamp utilizing a difference in luminance. Therefore, in the case of a frame frequency of 30 Hz, the number d1 of horizontal selection lines in each average luminance detection area 50 must be set at a value other than $3/10$ times, $6/10$ times or $9/10$ times the total number V of horizontal selection lines in one frame. FIG. 3 shows average luminance detection areas 50 formed by horizontal selection lines in a quantity that is $1/10$ of the total number V of horizontal selection lines.

Preferably, one, two or three average luminance detection areas are provided in one frame at intervals each of which is $3/10$ times the total number V of horizontal selection lines.

A difference in average luminance Ydave is then calculated between frames (e.g., a frame and the preceding frame) (step S3). Next, it is determined whether the difference in average luminance Ydave exceeds a predetermined threshold value (step S4). If the difference in average luminance Ydave exceeds the threshold value, it is judged that the emission frequency of the fluorescent lamp is 100 Hz because there is a difference in luminance in each frame, and a signal storage time ts is set which does not result in flickers at that emission frequency (step S5).

As described above, when the emission frequency of a fluorescent lamp is 1/100 sec., irregularities in luminance in one frame attributable to flicker noises have a period of 1/100 sec. Therefore, a possible value of the signal storage time ts in order to prevent the occurrence of flicker noises under the fluorescent lamp having an emission frequency of 100 Hz is 1/100, 2/100 or 3/100 sec. that is an integral multiple of the same period and that is equal to or shorter than 1/30 sec. which is one frame period of the CMOS image sensor.

If it is determined at step S4 that the difference in average luminance Ydave does not exceed the threshold, it is judged that there is no difference in luminance in each frame and that the emission frequency of the fluorescent lamp is 120 Hz, and the initially set signal storage time ts which does not result in flicker noises at that emission frequency is kept unchanged (step S6).

Flicker noises can be reduced by automatically determining the emission frequency of the fluorescent lamp in the image pickup environment at the above-describe steps and by adjusting the timing for inputting the reset signal RST to change the signal storage time ts.

As thus described, the present embodiment makes it possible to optimize an image pickup environment by detecting average luminance of the average luminance detection areas 50 in each frame and by calculating a difference in luminance between frames. It is therefore possible to reduce flicker noises attributable to a fluorescent lamp for room illumination when a picture is taken in door.

Figure 4:
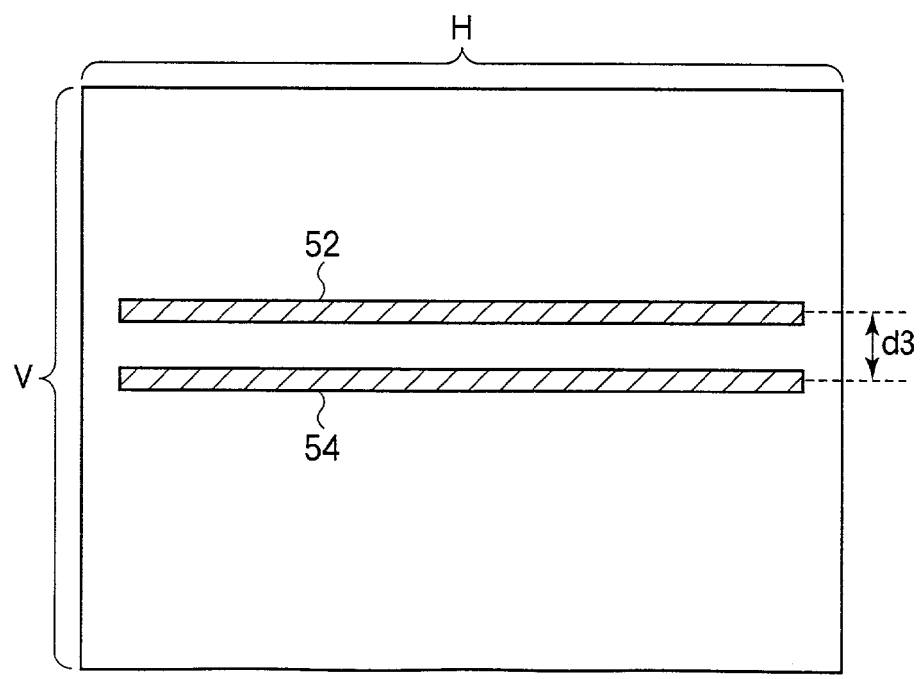
FIG. 4 illustrates a method of reducing flicker noises in a CMOS image sensor according to a second embodiment of the invention.
Figure 6:
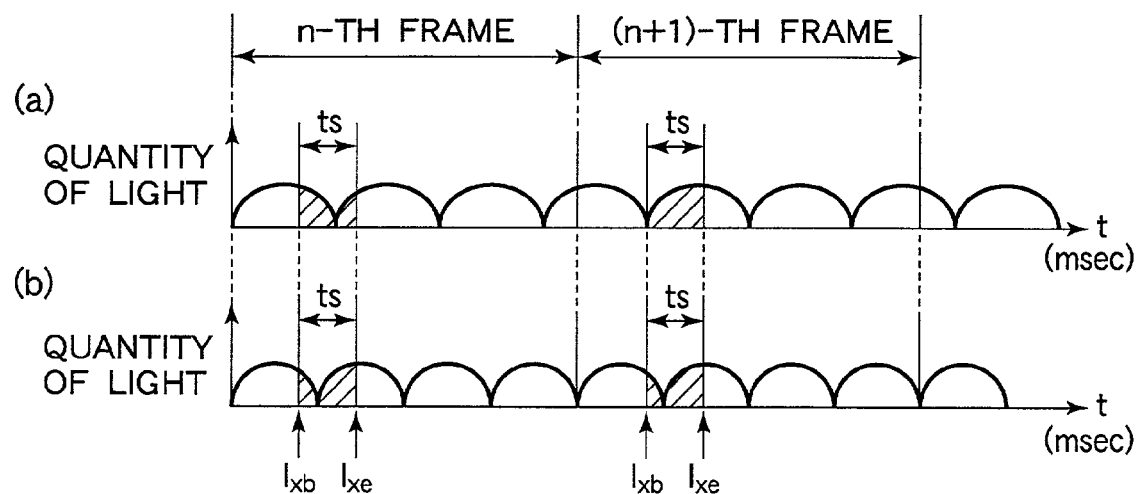
FIGS. 6(a) and 6(b) show relationships between emission frequencies of fluorescent lamps and a signal storage time of a conventional CMOS image sensor.
Figure 7:
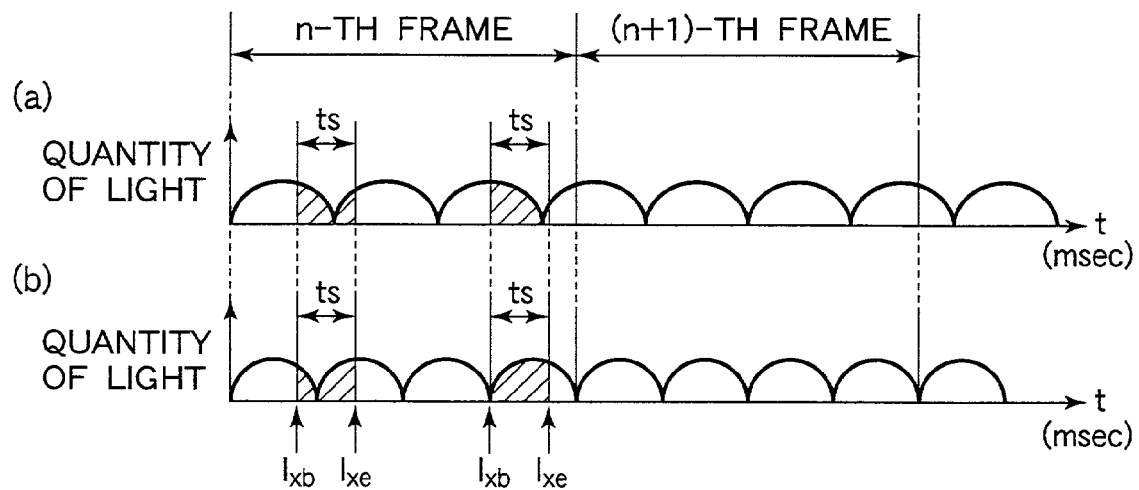
FIGS. 7(a) and 7(b) show relationships between emission frequencies of fluorescent lamps and a signal storage time of a conventional CMOS image sensor.
Figure 8:
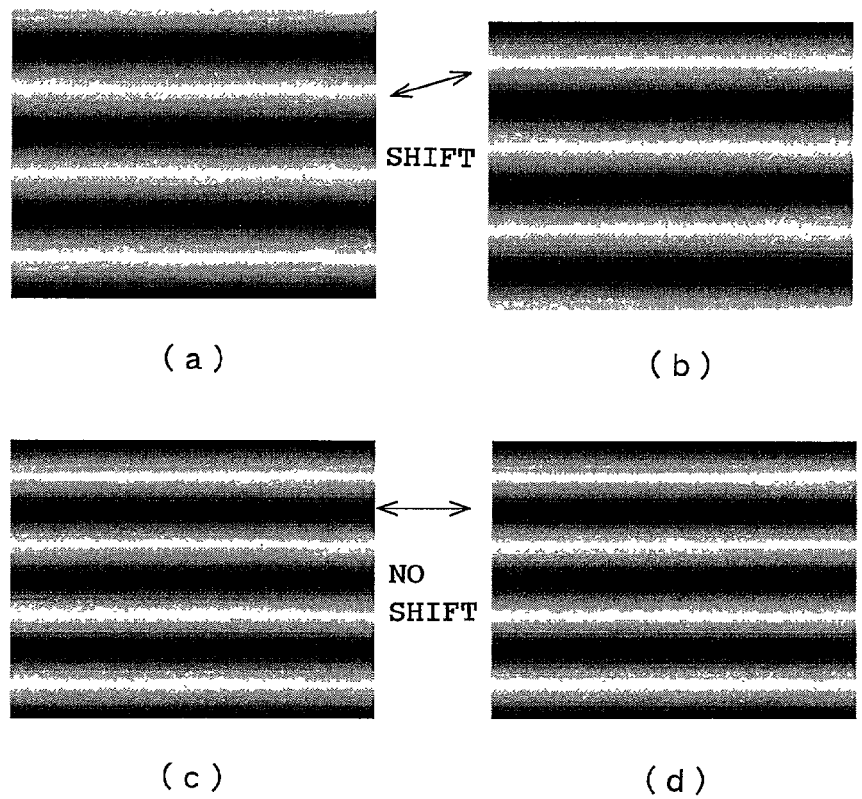
FIGS. 8(a) through 8(d) illustrate the occurrence of flicker noises in a conventional CMOS image sensor.
Figure 9:
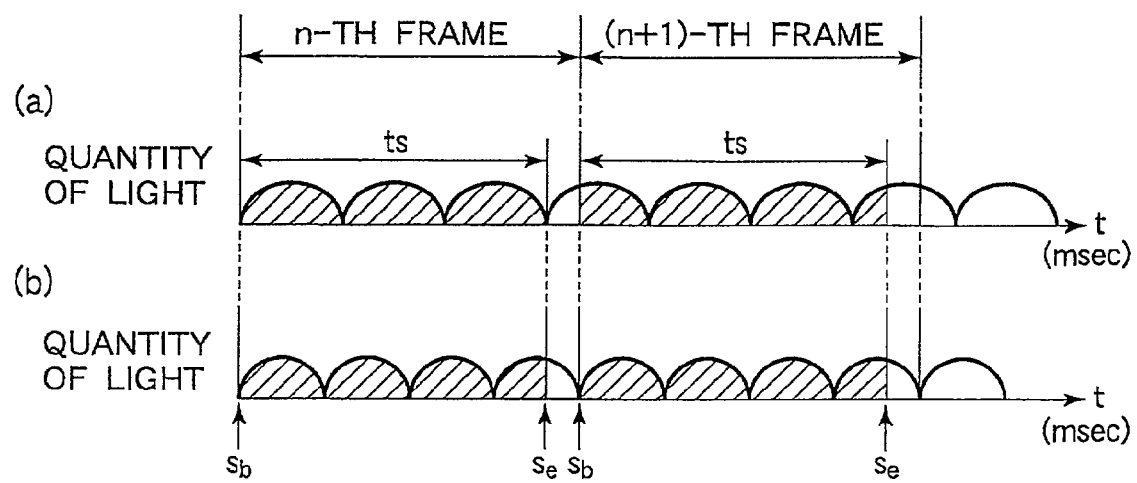
FIGS. 9(a) and 9(b) illustrate a method of reducing flicker noises in a conventional CCD solid-state image pickup device.

A method of reducing flicker noises in an X-Y address type solid-state image pickup device according to a second embodiment of the invention will now be described with reference to FIGS. 4 and 5. The present embodiment will also refer to a case in which two types of fluorescent lamps having emission frequencies of 100 Hz and 120 Hz are used or a CMOS image sensor as shown in FIG. 1 having a frame frequency of 30 Hz. FIG. 4 schematically shows a light-receiving surface of the CMOS image sensor. FIG. 5 shows sum-of-product coefficients used in the present embodiment.

By way of example, FIG. 4 shows two average luminance detection areas 52 and 54 provided in the vicinity of the center of the light-receiving surface and indicated by hatched lines. One horizontal selection line is assigned to each of the average luminance detection areas 52 and 54. The interval between the average luminance detection areas 52 and 54 is substantially equivalent to about d3 horizontal selection lines, and the d3 is set to satisfy:

$$d3 = V \times (1/2 - (\text{remainder of } A/B))/(A/B)$$

where A represents the emission frequency (Hz); B represents the frame frequency (Hz) of the CMOS image sensor; and V represents the total number of horizontal selection lines.

In the above equation for setting the interval between the average luminance detection areas 52 and 54, the value 1/2 indicates that a transition from the maximum intensity to the minimum intensity (transition from light to dark or from dark to light) occurs in a period that is 1/2 the period of irregularities of luminance. A/B represents the number of periods of irregularities of luminance in one frame attributable to flicker noises, and (remainder of A/B) represents a fraction of the periods of irregularities of luminance in one frame. By dividing (1/2−(remainder of A/B) by A/B, it is possible to find an interval d3 at which the maximum intensity and the minimum intensity of irregularities of luminance can be detected in the average luminance detection areas 52 and 54 without fail.

In the present example, the interval d3 between the average luminance detection areas 52 and 54 is 1/20 times the total number V of horizontal selection lines where the emission frequency A is 100 Hz and the frame frequency B of the CMOS image sensor is 30 Hz.

In the above-described configuration, first, the signal storage time of the CMOS image sensor is initialized to a signal storage time ts which does not result in flickers under a fluorescent lamp having an emission frequency of 120 Hz (this step corresponds to step S1 in FIG. 2).

Next, values of average luminance Yave52 and Yave54 of the image data in each of the average luminance detection areas 52 and 54 are calculated in 15.5 frames (which provides 31 pieces of average luminance data in total) (this step corresponds to step S2 in FIG. 2).

Next, sum-of-product calculations (cosine, sine) utilizing sum-of-product coefficients as shown in FIG. 5 are sequentially performed from the beginning to the end of the 31 pieces of average luminance data Yave52 and Yave54 in total. FIG. 5 shows coefficients for the 0th through 30th cosine terms in the left column and coefficients for the 0th through 30th sine terms in the right column. The coefficients for the 0th through 30th cosine terms are determined such that the sum of those values equals 0. The coefficients for the 0th through 30th sine terms are also determined such that the sum of those values equals 0.

Referring to the sum-of-product calculations specifically, there is provided a value that is obtained by multiplying average luminance Yave52(1) in the average luminance detection area 52 of the first frame by the coefficient −0.25 for the 0th cosine term in FIG. 5 and a value that is obtained by multiplying the average luminance Yave52(1) by the coefficient 0 for the 0th sine term in FIG. 5.

Then, there is provided a value that is obtained by multiplying average luminance Yave54(1) in the average luminance detection area 54 of the first frame by the coefficient −0.25 for the first cosine term in FIG. 5 and a value that is obtained by multiplying the average luminance Yave54(1) by the coefficient −0.25 for the first sine term in FIG. 5.

This is similarly repeated to provide a value that is obtained by multiplying average luminance Yave52(n(The n in 15.5-th flame is taken as 16)) in the average luminance detection area 52 of the n-th frame by the coefficient for the (2n−2)-th cosine term in FIG. 5 and a value that is obtained by multiplying the average luminance Yave52(n) by the coefficient for the (2n−2)-th sine term in FIG. 5.

There is also provided a value that is obtained by multiplying average luminance Yave54(n) in the average luminance detection area 54 of the n-th frame by the coefficient for the (2n−1)-th cosine term in FIG. 5 and a value that is obtained by multiplying the average luminance Yave54(n) by the coefficient for the (2n−1)-th sine term in FIG. 5.

Further, the 62 values in total thus obtained are totaled to obtain a sum-of-product calculation value (Yfave) (this step corresponds to step S3 in FIG. 2).

When a picture is taken under a fluorescent lamp having an emission frequency of 120 Hz, the sum-of-product calculation value (Yfave) is a value near 0. When a picture is taken under a fluorescent lamp having an emission frequency of 100 Hz, the Yfave increases if a signal storage time ts resulting in no flicker under the fluorescent lamp having an emission frequency of 120 Hz is set because flicker noises inevitably occur in such a case.

Therefore, an image pickup environment is judged as using a fluorescent lamp having an emission frequency of 120 Hz when Yfave≅0, and it is judges as using a fluorescent lamp having an emission frequency of 100 Hz if Yfave>0 (this step corresponds to step S4 in FIG. 2).

As thus described, according to the present embodiment, two average luminance detection areas 52 and 54 are provided in one frame; values of average luminance Yave52 and Yave54 of image data in the two average luminance detection areas 52 and 54 are calculated in a plurality of frames; a sum-of-product calculation process is performed on the plurality of values of average luminance Yave52 and Yave54 to calculate a sum-of-product calculation value Yfave; and a signal storage time ts is changed based on the sum-of-product calculation value Yfave, which makes it possible to optimize the image pickup environment. It is thus possible to reduce flicker noises generated by a fluorescent lamp for room illumination when a picture is taken in door.

The methods of reducing flicker noises in a CMOS image sensor according to the first and second embodiments may be carried out only when the power supply of the CMOS image sensor is turned on. Alternatively, those methods may be periodically carried out during the operation of the CMOS image sensor.

As described above, according to the first and second embodiments of the invention, an image pickup environment can be automatically detected based on only information available from pixels in an image area, and flicker noises can be reduced only by adjusting a signal storage time ts based on the results of detection. This makes it possible to improve the performance of an image sensor significantly.

The present invention is not limited to the above-described embodiments, and various modifications may be made.

For example, the above embodiments referred to examples in which a first emission frequency is 120 Hz; a second emission frequency is 100 Hz; and a frame frequency is 30 Hz. However, the present invention is not limited to such frequencies and is obviously applicable to different emission frequencies.

While values of average luminance Yave52 and Yave54 of image data in respective average luminance detection areas 52 and 54 are calculated in 15.5 frames (to provide 31 pieces of average luminance data in total) in the second embodiment, this is not limiting the invention. Obviously, the number of sum-of-product coefficients shown in FIG. 5 may be changed, and average luminance may be calculated for a plurality of frames associated with the updated number of coefficients.

As described above, according to the present invention, it is possible to reduce flicker noises generated in the X-Y address type image pickup device by a fluorescent lamp for room illumination when a picture is taken in door.

What is claimed is:

1. A method of reducing flicker noises attributable to the emission frequency of illumination light generated in an X-Y address type image pickup device having a plurality of pixels for performing photoelectric conversion of incident light in a predetermined signal storage time and outputting image data, the method comprising the steps of:
   providing two average luminance detection areas in each frame and calculating average luminance of the image data in the two average luminance detecting areas of a plurality of frames;
   performing a sum-of-product calculating process on the plurality of values of average luminance to calculate a sum of products; and
   changing the signal storage time based on the sum of products;
   wherein sum-of-product coefficients used in the sum-of-product calculating process are determined such that each group of coefficients total at 0 (zero) for both of sine terms and cosine terms.

2. A method of reducing flicker noises in an X-Y address type solid-state image pickup device according to claim 1, wherein one horizontal selection line is allocated as each of the two average luminance detection areas.

3. A method of reducing flicker noises in an X-Y address type solid-state image pickup device according to claim 1, wherein the alteration of the signal storage time based on the difference in luminance or sum-of-product calculation value is carried out at least when the power supply of the X-Y address type solid-state image pickup device is turned on.

4. A method of reducing flicker noises attributable to the emission frequency of illumination light generated in an X-Y address type image pickup device having a plurality of pixels for performing photoelectric conversion of incident light in a predetermined signal storage time and outputting image data, the method comprising the steps of:
   providing two average luminance detection areas in each frame and calculating average luminance of the image data in the tow average luminance detecting areas of a plurality of frames;
   performing a sum-of-product calculating process on the plurality of values of average luminance to calculate a sum of products; and
   changing the signal storage time based on the sum of products;
   wherein one horizontal selection line is allocated as each of the two average luminance detection areas; and
   wherein the interval between the two average luminance detection areas is set as $V \times (\frac{1}{2}-(\text{remainder of } A/B))/(A/B)$ where A represents the emission frequency (Hz); B represents the frame frequency (Hz) of the X-Y address type solid-state image pickup device; and V represents the total number of horizontal selection lines.

5. A method of reducing flicker noises in an X-Y address type solid-state image pickup device according to claim 4, wherein the interval between the two average luminance detection areas is set at $\frac{1}{20}$ times the total number V of horizontal selection lines where A=100 Hz and B=30 Hz.

6. A method of reducing flicker noises in an X-Y address type solid-state image pickup device according to claim 1, comprising the steps of:
   presetting a first signal storage time which allows reduction of flicker noises under illumination light having a first emission frequency; and
   changing the signal storage time to a second signal storage time which allows reduction of flicker noises under illumination light having a second emission frequency when the difference in luminance or sum-of-product calculation value exceeds a predetermined threshold value.

7. A method of reducing flicker noises generated due to a first emission frequency or a second emission frequency of illumination light in an X-Y address type solid-state image pickup device having a plurality of pixels for photo-electrically converting incident light in a predetermined signal accumulation time to output the photo-electrically converting incident light as image data, the method comprising:
   providing two average luminance detecting regions in one frame and calculating an average luminance of the image data in the two average luminance detecting regions in a plurality of frames thereof during the signal accumulation time that is set to be an integral multiple of the first emission frequency;

performing a sum-of-product calculation process on the plurality of average luminance to obtain a calculated sum of products;

determining which of the first emission frequency and the second emission frequency the illumination light has from the calculated sum of products; and changing the signal accumulation time to an integral multiple of the second emission frequency when the frequency is determined as the second emission frequency;

wherein sum-of-product coefficients used in the sum-of-product calculation process are determined such that each group of coefficients total at 0 for both of sine terms and cosine terms.

8. A method of detecting flicker noises generated due to a second emission frequency of illumination light having first and second emission frequencies in an X-Y address type solid-state image pickup device having a plurality of pixels for photo-electrically converting incident light in a predetermined signal accumulation time to output the photo-electrically converting incident light as image data, the method comprising:

providing two average luminance detecting regions in one frame and calculating an average luminance of the image data in the two average luminance detecting regions in a plurality of frames thereof during the signal accumulation time that is set to be an integral multiple of the first emission frequency;

performing a sum-of-product calculation process on the plurality of average luminance to obtain a calculated sum of products; and detecting the occurrence of the flicker noises attributable to the second emission frequency when the calculated sum of products is not 0;

wherein sum-of-product coefficients used in the sum-of-product calculation process are determined such that each group of coefficients total at 0 for both of sine terms and cosine terms.

9. An X-Y address type solid-state image pickup device having a plurality of pixels for photo-electrically converting incident light in a predetermined signal accumulation time to output the photo-electrically converting incident light as image data, the device comprising:

an average luminance calculation section providing two average luminance detecting regions in one frame and calculating an average luminance of the image data in the two average luminance detecting regions in a plurality of frames thereof during the signal accumulation time that is set to be an integral multiple of a first emission frequency;

a sum-of-products calculation section performing a sum-of-product calculation process on the plurality of average luminance to obtain a calculated sum of products;

a frequency determination section determining which of the first emission frequency and a second emission frequency the illumination light has from the calculated sum of products; and a signal accumulation time changing section changing the signal accumulation time to an integral multiple of the second emission frequency when the frequency determination means determines that the frequency the second emission frequency;

wherein sum-of-product coefficients used in the sum-of-product calculation process are determined such that each group of coefficients total at 0 for both of sine terms and cosine terms.

10. An X-Y address type solid-state image pickup device having a plurality of pixels for photo-electrically converting incident light in a predetermined signal accumulation time to output the photo-electrically converting incident light as image data, the device comprising:

an average luminance calculation section providing two average luminance detecting regions in one frame and calculating an average luminance of the image data in the two average luminance detecting regions in a plurality of frames thereof during the signal accumulation time that is set to be an integral multiple of a first emission frequency;

a sum-of-product calculation section performing a sum-of-product calculation process on the plurality of average luminance to obtain a calculated sum of products; and a flicker noise detection section detecting the occurrence of flicker noises attributable to a second emission frequency when the calculated sum of products is not 0;

wherein sum-of-product coefficients used in the sum-of-product calculation process are determined such that each group of coefficients total at 0 for both of sine terms and cosine terms.

11. A method of reducing flicker noises attributable to the emission frequency of illumination light generated in an X-Y address type image pickup device having a plurality of pixels for performing photoelectric conversion of incident light in a predetermined signal storage time and outputting image data, the method comprising:

calculating an average luminance of the image data in a plurality of average luminance detecting areas of at least one frame; and adjusting the signal storage time according to a sum-of-product calculation performed on the average luminance values;

wherein the sum-of-product calculation includes sine term coefficients having a sum of 0, and cosine term coefficients having a sum of 0.

* * * * *

UNITED STATES PATENT AND TRADEMARK OFFICE
CERTIFICATE OF CORRECTION

PATENT NO. : 7,106,368 B2  
APPLICATION NO. : 10/012391  
DATED : September 12, 2006  
INVENTOR(S) : Hiroshi Daiku et al.

It is certified that error appears in the above-identified patent and that said Letters Patent is hereby corrected as shown below:

TITLE Page, ITEM (57) (Abstract), Line 5-7, delete space between lines 5 and 7.

Column 10, Line 23, change "tow" to --two--.

Signed and Sealed this

Twenty-ninth Day of May, 2007

JON W. DUDAS  
*Director of the United States Patent and Trademark Office*